United States Patent [19]
Scott et al.

[11] Patent Number: 5,638,504
[45] Date of Patent: Jun. 10, 1997

[54] SYSTEM AND METHOD OF PROCESSING DOCUMENTS WITH DOCUMENT PROXIES

[75] Inventors: Kirk M. Scott, San Francisco; Robert D. Dickinson, Hayward; Frank T. Nguyen, Campbell; Ryoji Watanabe, Cupertino, all of Calif.

[73] Assignee: Object Technology Licensing Corp., Cupertino, Calif.

[21] Appl. No.: 625,775

[22] Filed: Mar. 29, 1996

Related U.S. Application Data

[63] Continuation of Ser. No. 210,846, Mar. 21, 1994, abandoned.

[51] Int. Cl.[6] .................................................. G06F 17/30
[52] U.S. Cl. ........................ 395/7.61; 395/792; 395/348; 395/356
[58] Field of Search .............................. 395/145, 155, 395/156, 157, 158, 159, 160, 161, 700; 364/419.19

[56] References Cited

U.S. PATENT DOCUMENTS

| | | | |
|---|---|---|---|
| 4,885,717 | 12/1989 | Beck et al. | 395/775 |
| 4,891,630 | 1/1990 | Friedman et al. | 345/156 |
| 4,953,080 | 8/1990 | Dysart et al. | 395/600 |
| 5,041,992 | 8/1991 | Cunningham et al. | 395/135 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,140,677 | 8/1992 | Fleming et al. | 395/159 |
| 5,140,678 | 8/1992 | Torres | 395/159 |
| 5,142,618 | 8/1992 | Fujiwara | 395/146 |
| 5,151,987 | 9/1992 | Abraham et al. | 395/575 |
| 5,181,162 | 1/1993 | Smith et al. | 364/419.19 |
| 5,317,687 | 5/1994 | Torres | 395/159 |
| 5,317,688 | 5/1994 | Watson et al. | 395/161 |
| 5,341,293 | 8/1994 | Vertelney et al. | 364/419.17 |
| 5,367,635 | 11/1994 | Bauer et al. | 395/200 |

OTHER PUBLICATIONS

Atkinson et al., Using C, Que® Corporation, 1990, pp. 685–687.
*Microsoft Mail for Windows*, Computer Consulting & Training, Inc., May 1993, pp. 1, 5, 12.
BYTE, v. 16(2), Feb. 1991, St. Peterborough US, pp. 211–221, Carr "The Point of the Pen".
IBM Technical Disclosure Bulletin, v. 35(4A) Sep. 1992, New York, US, pp. 85–86 "Input Technique to Support Both Text and Object Input".
*Input Technique to Support Both Text and Object Input*, IBM Technical Disclosure Bulletin, vo. 35 No. 4A, Sep. 1992, pp. 85–86.
*The Point of the Pen*, Robert M. Carr, Laptop Technologies, Feb. 1991, pp. 211–214, 216, 219–221.
International Search Report, dated Aug. 15, 1995.

*Primary Examiner*—Heather R. Herndon
*Assistant Examiner*—Stephen Hong
*Attorney, Agent, or Firm*—Bookstein & Kudirka

[57] ABSTRACT

An object-oriented document architecture provides system level support for document processing features from within an active document utilizing a novel technique termed a proxy. A proxy integrates external document management functions simultaneously and seamlessly into the standard operating system document processing commands. The system utilizes a revolutionary object-oriented framework system to provide an interface facilitating document access and editing functions from within a document or other active application.

19 Claims, 7 Drawing Sheets

SYSTEM AND METHOD OF PROCESSING DOCUMENTS WITH DOCUMENT PROXIES

This is a continuation, of application Ser. No. 08/210, 846, filed Mar. 21, 194, now abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to computer systems, and more particularly to a method and system for managing document proxies in a document processing system.

BACKGROUND OF THE INVENTION

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygard of Norway. Further information on the subject of OOP may be had by reference to Object Oriented Design with Applications by Grady Booch, The Benjimin/Cummings Publishing Co., Inc., Redwood City, Calif. (1991).

With the brief overview of OOP above in mind, document processing has virtually revolutionized the way society generates publications. Typical prior art document processing systems run on top of operating systems, such as DOS. More recently, these document processing systems have been designed to run in a Windows environment. Many of these document processing systems are commercially available. While these document processing systems have improved the ability to process documents and text, there is great inconsistency among document processors with respect to processing methodologies. The result of these inconsistencies creates problems for both application developers and users of the applications.

Application developers must continuously "reinvent the wheel" when creating a new document processor. While operating systems and interface programs provide some tools which may be used, the great majority of the design process for a particular document processor is directed toward creating a group of processing modules which cooperate to allow a user to process documents. Application developers often design processing modules which have already been developed by another company. This requires great duplication of effort, and requires each developer to deal with the details of how to implement various desired functions.

Most graphical computer interface systems provide a user with an interface presented on a graphical display and access to information in one or more graphically presented entities—"documents"—, e.g. a word processor document that allows the user to read and edit the contained textual data. Several graphical computer user interface systems available today, like that of the Apple® Macintosh® computer, provide the user with the capability of graphically managing and organizing multiple document entities represented as small manipulable graphic entities, e.g. "icons". An example of a function in such a system is the ability for the user to request the movement of a document from one containing entity to another by graphically dragging the iconic representation of the document from one document and dropping it onto another document. On currently available systems that support both of the above categories of functions, the system makes the two categories of functions available in disjoint modes of operation. For instance, on the Apple Macintosh, a user must deviate from the mode of editing an open document by switching to the Finder application to perform the document management functions such as moving a document. No system that applicant is aware of has a proxy function for integrating document processing into basic system operations.

SUMMARY OF THE INVENTION

It is an object of the present invention to provide a document processing system utilizing a unique feature terms a "proxy". A proxy integrates external document management functions simultaneously and seamlessly into the standard operating system document processing commands. This system and method provides an interface supporting document access and editing functions from within a document or other active application.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The history of object-oriented programming and the development of frameworks is well-established in the literature as described in the background of the invention, and C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications" by Grady Booch, ISBN 0-8053-0091-0 (1991). While many object oriented systems are designed to operate on top of a basic operating system performing rudimentary input and output, the present system is used to provide system level support for particular features.

Figure 1:
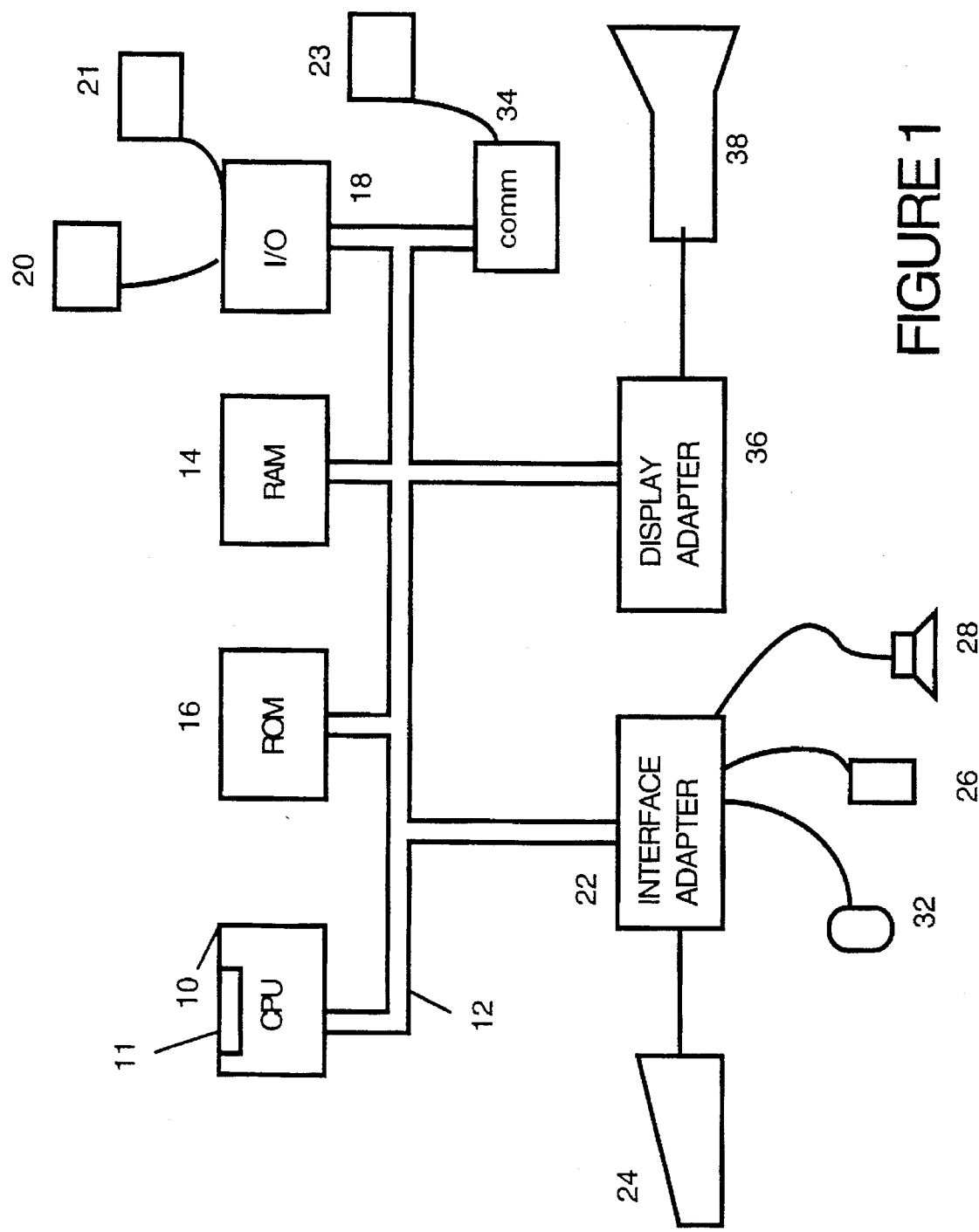
FIG. 1 is a block diagram of a personal computer system in accordance with a preferred embodiment of the invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon an operating system such as the Apple System 7® operating system.

The main goal of the document framework disclosed herein is to raise the base level of applications by enabling several new features at the system level. In addition, the lack of system support for these features limits their implementation. For example, there are applications that allow users to annotate static representations (pictures) of any document, but not the "live" document itself. The content-based retrieval applications have trouble accessing the contents of document because each application has a custom file format. Also, once the application finds a document, it is difficult to do anything with it. There's no system-level support for opening the document, for example. The document framework also includes a number of higher-level capabilities, such as annotation support, which are built upon these basic services. To the extent possible, the document framework does not specify any policy or user interface decisions. A proxy provides a means of making all or a subset of external document management functions available simultaneously and seamlessly in an interface supporting document access and editing functions.

Figure 2:
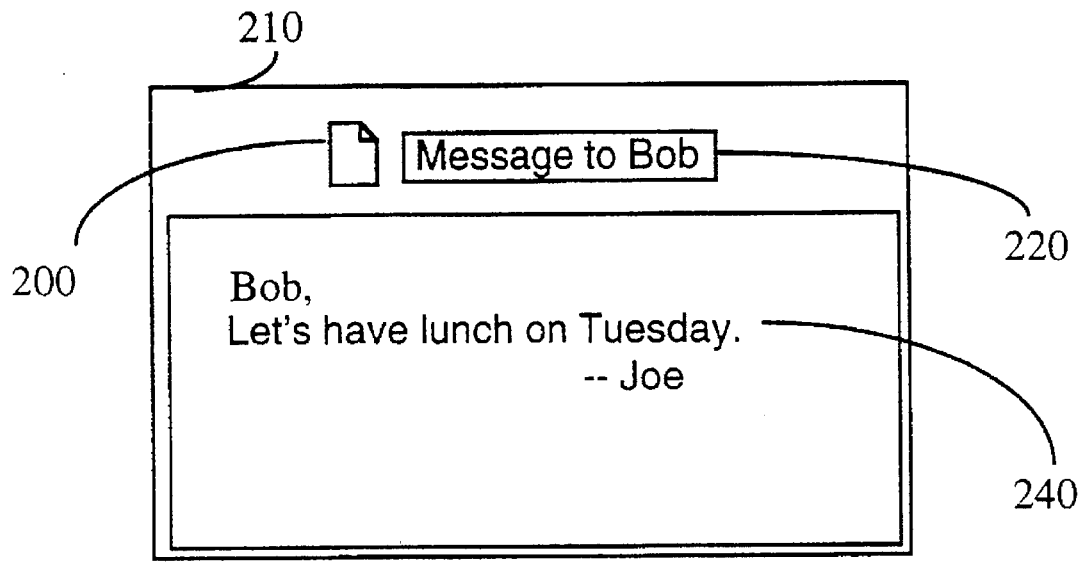
FIG. 2 is an illustration of a display with a document proxy in accordance with a preferred embodiment of the invention.

FIG. 2 illustrates a display of a document with an imbedded proxy in accordance with a preferred embodiment. A window 210 displays an opened document containing a proxy 200 which is represented by a geometrical figure, in this case, in the shape of a document signifying to a user the integration of another document into the current document 240. In addition, the proxy can have a title 220 of the integrated document displayed next to the proxy 200. In this embodiment, the proxy is presented as an icon. However, one of ordinary skill in the art will readily comprehend that a proxy could be indicated to a user via a colored or otherwise annotated area on the display, a circle or any other geometric figure, or any other icon. The proxy supports any operation that a similar iconic representation supports when the icon appears in an interface for document management. For instance, the proxy may be dragged to a representation of a container entity somewhere else on the desktop representation on the screen and deposited therein to create a copy of the associated document. For all such operations, the proxy represents the document that the window (which it appears on) is presenting. For instance, by dragging the proxy icon to a container entity on the desktop, the document with title "Message to Bob" is moved or copied to the specified location.

Also, we have described here (for illustrative purposes) only one function in the category of document management functions that traditional user interface systems make available through other modal means and which can better and more seamlessly be provided through the proxy. It will be understood by one of ordinary skill in the art that any other document processing function can also be invoked utilizing the proxy. For example, a user could drag the proxy to another document to provide a copy of the proxy in the other document. Also, a user could double-click on a proxy to open the document associated with the proxy. Similarly, dragging a proxy to a printer or mailbox will facilitate printing or transmitting the document to an attached computer.

Figure 3:
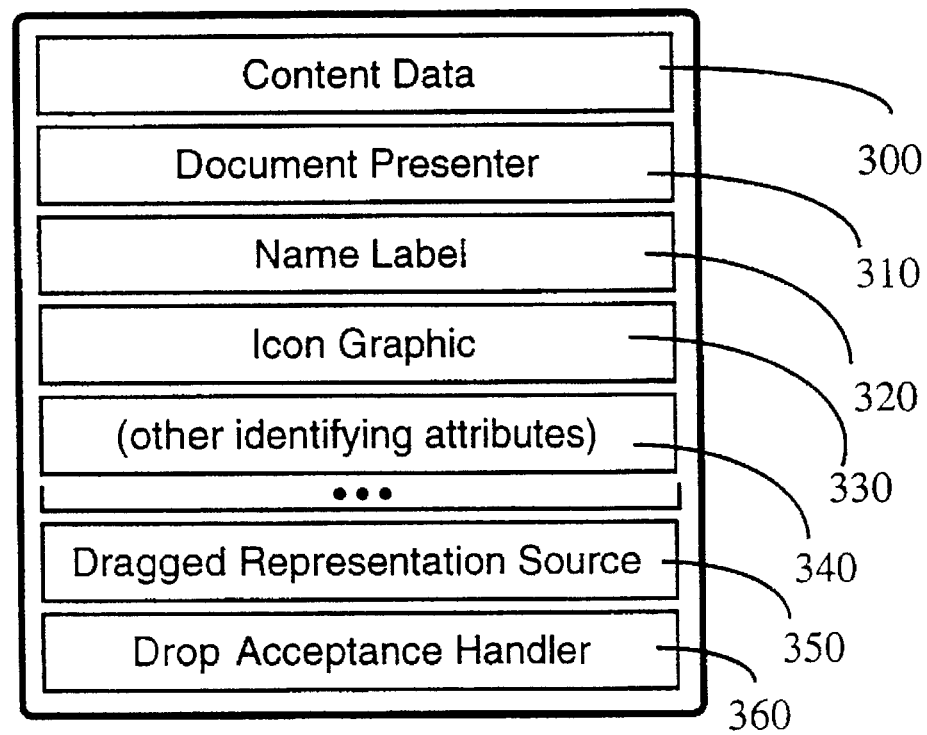
FIG. 3 is a data structure of information associated with a typical document stored in accordance with a preferred embodiment.

"Document" refers to a user manipulable object that a computer system presents to the user as a unit entity that can be opened, read, edited, copied, deleted, etc. A stored document, refers to an encapsulated unit of data managed by a computer system that defines a document instance. For the specific implementation of a stored document that resides physically on a file system, the term "stored" refers to saving a data structure of information as depicted in FIG. 3, and the associated information in a storage device. However, storage does not preclude other means of internally managing data of the same externally observable structure so long as the access to the data conforms to the behaviors described in this application. In addition, for an implementation based on storage in a file system, details of how the file system is used to store the relevant structure to be described is unimportant for this discussion.

FIG. 3 is an illustration of a data structure in accordance with a preferred embodiment. The stored document has this structure, and those aspects that are relevant to the mechanisms necessary for implementing the proxy will be discussed in additional detail.

The stored document contains 300 content data, which is the data that is presented and becomes accessible to the user when the document is opened.

The stored document contains a document presenter object 310, which is responsible for handling the graphical presentation of the document's content data when the document is opened. In general, it is not required that this is stored as part of the document so long as the mechanism that opens the document for display is able to come up with a suitable document presenter. The document data structure is included for concreteness in the description that follows below.

The stored document contains identifying attributes 340, like a name and an icon graphic. Examples of other identifying attributes include the following: Creation and modification dates, color, urgency label, classification, owner, size.

The stored document contains a dragged representation source object 350, which is explained below.

The stored document contains a drop acceptance handler object 360, which is explained below.

A stored document may have additional structure and capability in support of other mechanisms not covered here; these do not effect the descriptions here. Note that the natural realization of the stored document in an object-oriented design is to design an abstraction which defines the behavior of providing access to the components depicted above while hiding the details of implementing the actual storage management of the components.

DRAG-AND-DROP MECHANISM OF A PREFERRED EMBODIMENT

The descriptions that follow this section describe, for clarity, a preferred embodiment that uses a mechanism called drag-and-drop. In the preferred embodiment, graphical objects appear as independent objects (e.g. windows) on the desktop responding to user input. The system supplies user input information in the form of event objects which record what type of user input the system incurred from the user along with more detailed information about the event. An example of an event is "mouse down" which reports that a user has depressed a button on the mouse input device. The detailed information of the event includes the position of the cursor at the time the mouse button was depressed. Graphical objects appearing on the desktop which respond to user input are implemented as event handlers. An event handler provides an event-supplying the following: an event queue to receive events into, and an associated thread of execution which sequentially takes events off of the queue and processes them by responding to the event with a programmed behavior determined by the object's implementation. The programmed behavior varies from object to object depending on the object's function. The detailed logic associated with event handling is described in copending patent application Ser. No. 07/996,782 entitled, Object-Oriented Notification Framework System, and incorporated herein by reference.

The preferred embodiment does not rely on a particular association between threads of execution and event handlers. As long as the association is such that a thread of execution ultimately handles an event waiting in a participating event queue, the implementation is sufficient. Specifically, there is no strict dependence on the number of threads of execution involved in implementing the mechanisms. Drag-and-drop is a specific interaction based on event-handling graphical objects which is used to implement a user-interface interaction which metaphorically represents the selection of a graphical entity at one point or context on the desktop, "carrying" the graphical entity to some other point or context, and "dropping" it to place at the destination point or to provide it to the destination context. The "carrying" part of the operation is often called "dragging", hence the term drag-and-drop.

A typical drag-and-drop interaction includes the following detailed operation described concretely based on a system implementing the preferred embodiment and therefore a system implementing drag-and-drop. For precision, and for clearest communication to those skilled in the art, the important object classes are described using the standard C++ language. The described class designs are based on an actual system in accordance with the preferred embodiment. Specifically, the following rules are adhered to.

Class and method names have been altered to focus and close the terminology.

Standard C++ member functions for default construction, copy construction, destruction, and assignment as appropriate are omitted from the description; however, special constructors that take special arguments are described.

The private internal data structure of the classes that support the implementation of the class's operations are omitted (An exception to this is where a concrete example is being provided for clarity). One of the benefits of object-oriented programming is that classes are defined in terms of the behavior of the externally published member functions rather than the internal implementation structure; therefore, even programmers working with actual objects on the preferred embodiment will not see (or will not be able to depend on) this internal implementation structure. The important design points are carried by the class interfaces, not the implementation details.

A mechanism for copying object instances from one execution environment (e.g. address space) to another or for transferring values to and from persistent storage is assumed. For instance, one such scheme for implementing this is to have each class provide a set of "streaming" operators which convert an object's value to and from a flat byte-stream representation.

A class is described that will be used below in operations that compare or relate the type of participating class objects. A C++ interface for class TTypeDescription in accordance with a preferred embodiment appears directly below.

```
typedef char* ClassName;
class TTypeDescription {
public:
    TTypeDescription(ClassName className);
    virtual Boolean IsA(const TTypeDescription& baseType);
};
Boolean operator==(const TTypeDescription& left, const TTypeDescription&
right);
```

A TTypeDescription object encodes the type identity for a specific class. For instance, in order to create a value encoding the type of a class called TText, one can create a type description instance as follows: TTypeDescription ("TText"). TTypeDescriptions can be compared by the equality operator (==) to see if they represent the same class. Advanced implementation may provide a method "IsA( )"

which can be used to check if one type is a subclass of another type. I.e., if aType is a TTypeDescription for a class TA and bType is a TTypeDescriptin for a class TB, then bType.IsA(aType) returns TRUE if B is a subclass of A and return FALSE otherwise. The description below only strictly depends on the presence of the equality comparison; the "IsA( )" function is mentioned as a common and useful elaboration.

Next, we describe the software-object embodiment of the entity that is "dragged" in a drag-and-drop interaction. All such objects are instances of subclasses of the abstract class TDraggedRepresentation, which is shown directly below.

```
class TDraggedRepresentation {
public:
    virtual void GetAvailableTypes(TListOf<TTypeDescription>& result) const = 0;
};
```

For instance, in order to arrange for a drag-and-drop interaction to carry a piece of text as its data, one can provide a subclass TDraggedRepresentationForText which is shown directly below.

```
class TDraggedRepresentationForText : public TDraggedRepresentation {
public:
    virtual void GetAvailableTypes(TListOf<TTypeDescription>& result) const;
        //Overridden to return "TText" as the available type.
    virtual void GetTextData(TText& result) const;
private:
    TText fTextData;
};
```

A class named TText which holds a piece of text data and provides the interface for operations on that piece of text data. It is useful to support the ability to manage an abstract collection of TDraggedRepresentation objects, possibly simultaneously holding instances of different subclasses (by "abstract", we mean that the object is accessed or managed through an abstract interface like TDraggedRepresentation rather than by a concrete subclass interface like TDraggedRepresentationForText). Since the content data and the protocol to access it is introduced by the subclass (e.g., TDraggedRepresentationForText), it is useful for the client of an abstract collection of TDraggedRepresentation objects to be able to query an instance for its content data type. This is supported by the virtual GetAvailableTypes( ) member function of TDraggedRepresentation. For instance, the subclass TDraggedRepresentationForText can override this member function to return TTypeDescription("TText") to signify that it makes TText data available. In the depicted form, GetAvailableTypes( ) is allowed to return a list of available types via a list data structure TListOf<TTypeDescription> which is a simple ordered list of TTypeDescriptions based on a template of the form is commonly seen in many support libraries (the detailed interface is unimportant here). Given this information plus a convention for associating the content type with the TDraggedRepresentation subclass that carries that data, the client can cast the abstract object to the concrete subclass type and then call subclass member functions to access the specific content data.

Figure 4:
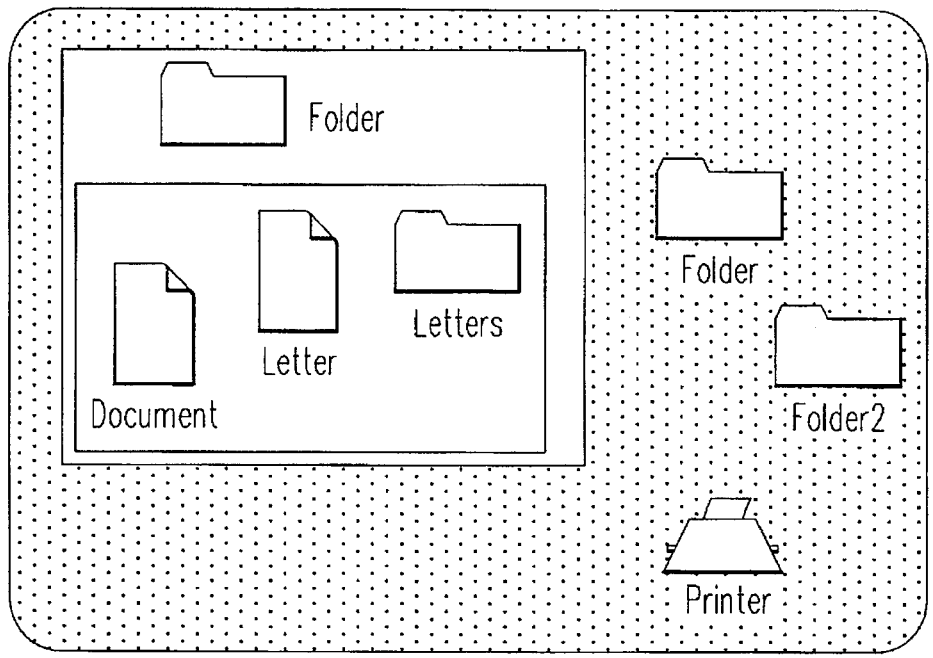
FIG. 4 is a schematic that depicts a desktop screen in accordance with a preferred embodiment.
Figure 5:
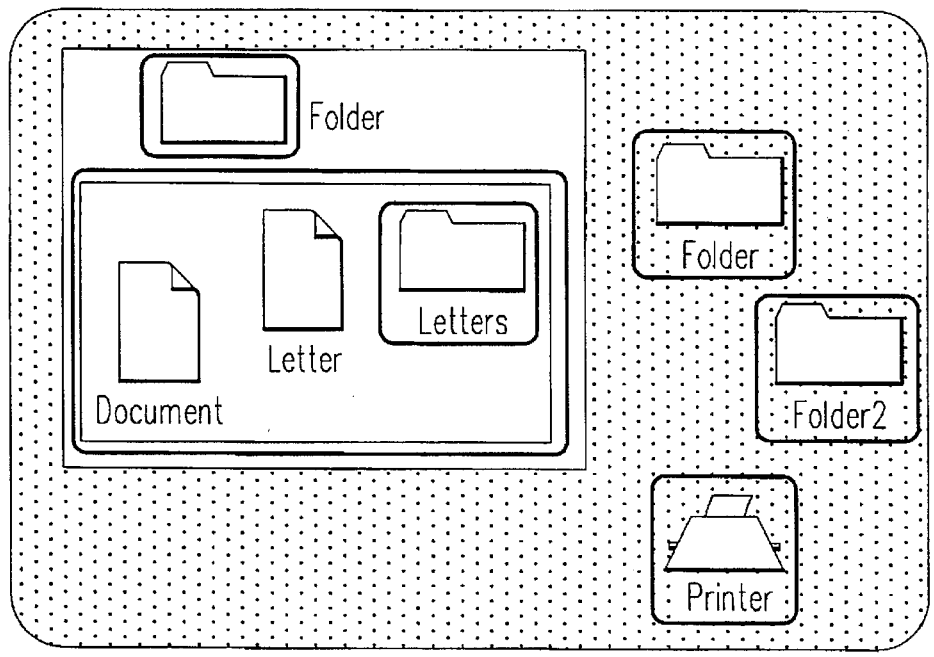
FIG. 5 is a schematic with drop-accepting objects or target regions highlighted in accordance with a preferred embodiment.

The desktop system is in a state receptive to a drag-and-drop interaction by having active graphical objects displayed on the screen which publish themselves to the system as targets capable of accepting objects that are dragged to them and dropped. FIG. 4 is a schematic that depicts a desktop screen in accordance with a preferred embodiment. FIG. 5 is a schematic with drop-accepting objects or target regions highlighted in accordance with a preferred embodiment.

A graphical object in the preferred embodiment publishes itself to the system as a drop-accepting target as a subclass of class MDropAcceptor, shown directly below.

```
class MDropAcceptor : public MDragAndDropEventHandler {
public:
    MDropAcceptor(TView* view);
        virtual Boolean ChoosePreferredType(
    TListOf<TTypeDescription> &availableTypes,
        TTypeDescription& chosenType) = 0;
        virtual void    AcceptDrop(TGPoint whereDropped,
                                    const TTypeDescription &theType,
                                    const TDraggedRepresentation&
    chosenrePresentation) = 0;
        virtual void  Drop(TDropEvent& event);
        virtual void  DragEnter(TDragEnterEvent& event);
        virtual void  DragExit(TDragExitEvent& event);
        virtual void  DragMove(TDragMoveEvent& event);
};
```

MDropAcceptor provides two, pure virtual member functions which the subclasser implements to define part of the drop acceptance behavior: ChoosePreferredType( ) is a member function which receives a list of candidate representation types (e.g. representations of an item that is being dragged) and which is implemented to return TRUE along with the most preferred type in the parameter chosenType or FALSE if there is nothing in the list that is acceptable. AcceptDrop( ) is the member function that is called to cause the MDropAcceptor subclass to accept a representation of an item that is dropped on it (of a representation type previously chosen as acceptable in ChoosePreferredType( )). (The TGPoint parameter is explained below). MDropAcceptor is a subclass of MDragAndDropEventHandler, whose function will be developed in the descriptions below.

We assume a system facility for managing the activity and visibility of event-handling graphical objects which appear on the desktop, e.g. by having the objects be members of an active graphical object hierarchy (e.g. a window management system); we will call the class of participating event-handling graphical objects TView. TView objects encode their graphical orientation (size, shape, location), have the ability to draw themselves (e.g. to support requests from the system to update a portion of the screen they are visible on), and have the ability to receive and handle a multitude of events, some of which are described below.

Figure 6:
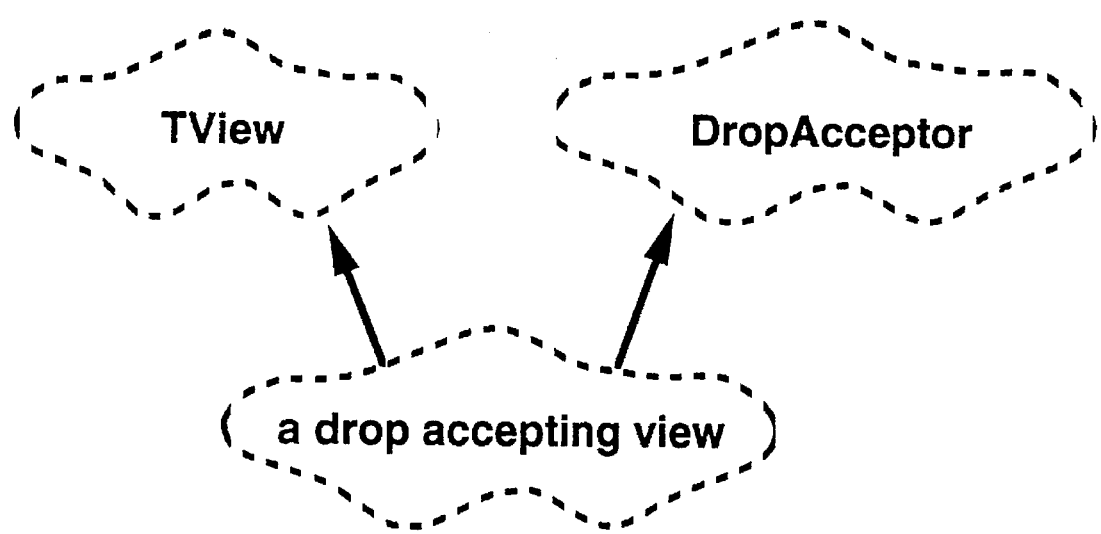
FIG. 6 is a Booch diagram depicting this processing in accordance with a preferred embodiment.

A complete drop accepting graphical object is defined by subclassing from a TView and MDropAcceptor (or subclasses of them). FIG. 6 is a Booch diagram depicting this processing in accordance with a preferred embodiment. As described above, MDropAcceptor is subclassed to specify the representation type acceptability of a drop acceptor. Subclassing from TView completes the picture by providing the following: It specifies the graphical orientation of the drop accepting target as a region of the screen; it serves to define the object's graphical appearance, especially to convey that it is an entity that the user can drag and drop something to (for instance, by looking like a folder icon); lastly it serves to make the connection to the system's source of events, which as we will see below is used to implement several important mechanisms. The whereDropped parameter in AcceptDrop( ) is of a system type TGPoint which records a 2-D coordinate point value, and in this member function it is used to specify where on the drop accepting view the dragged item was dropped.

Returning to FIG. 4, the state of the system is that there are several drop accepting view subclasses (subclassed from both TView and MDropAcceptor) which are active and visible on the desktop screen. Each drop accepting view instance publishes itself as a drop acceptance target of a certain graphical orientation and has the ability to accept a certain types of dragged representations.

A system that is in a state receptive for a drag-and-drop interaction is shown in FIG. 4, i.e. in a state where a dragged item can be dropped on something, and all the parts that make up that state. A description of the side of the interaction that provides the item that is dragged is provided next.

A graphical object which makes a draggable available sees the initiation of a user's drag gesture as input from the mouse device, i.e. as events from the mouse device. In the system implementing the preferred embodiment, objects which are receivers of mouse input events are subclasses of MMouseEventHandler shown directly below.

```
class MMouseEventHandler {
public:
    MMouseEventHandler(TView* view);
    virtual Boolean  MouseDown(TMouseDownEvent& event) = 0;
    virtual Boolean  MouseUp(TMouseUpEvent& event) = 0;
    virtual Boolean  StartMouseEntryEvents( );
    virtual Boolean  StopMouseEntryEvents( );
    virtual Boolean  MouseEntered(TMouseEnteredEvent& event) = 0;
    virtual Boolean  MouseExited(TMouseExited& event) = 0;
    virtual Boolean  StartMouseMovedEvents( );
    virtual Boolean  StopMouseEntryEvents( );
    virtual Boolean  MouseMoved(TMouseMovedEvent& event) = 0;
};
```

MMouseEventHandler has member functions for receiving events for each mouse action named by a member function. MouseDown( ) and MouseUp( ) are called to handle events corresponding to the user depressing and releasing the mouse button, respectively. MouseEntered( ) and MouseExited( ) are described below. MouseMoved is called in response to an event corresponding to any positional change of the mouse. Since it is not appropriate for all mouse event handler existing at a given time to be getting reports of all mouse motions all the time, there is a method StartMouseMovedEvents( ) and StopMouseMovedEvents( ) to selectively start and stop the reception of MouseMoved events in an MMouseMovedHandler.

Figure 7:
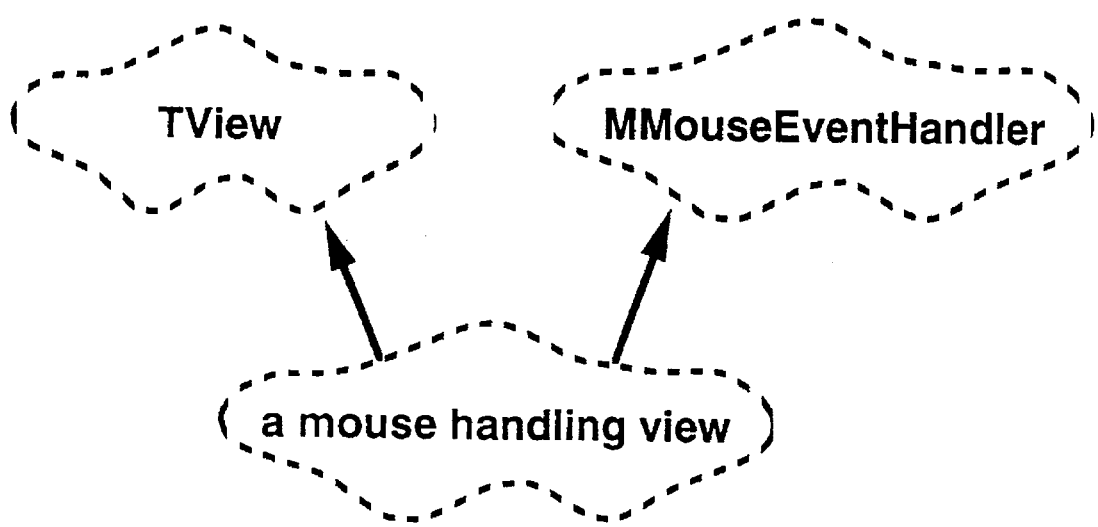
FIG. 7 is a Booch diagram which presents the logic of mouse event handling in accordance with a preferred embodiment.

A complete mouse-input responsive graphical object is defined by subclassing from TView and MMouseEventHandler (or subclasses of them) and illustrated in FIG. 7 which presents the logic utilizing a Booch diagram depicting a "mouse event handling view" as a subclass of TView and MMouseEventHandler. The C++ code to implement this function is provided directly below.

```
class TDragAndDropInteractor {
public:
    TDragAndDropInteractor(TListOf<TDraggedRepresentation>,
        MGraphic* adoptedDragGraphic);
    virtual void  DropAt(const TGPoint &where);
    virtual void  DragAt(const TGPoint &where);
};
```

As described above, MMouseEventHandler is subclassed to specify an object's response to mouse events. Subclassing from TView completes the picture by providing the following information. It serves to specify the graphical orientation of the region of the screen that is sensitive to mouse event handling by the object. It serves to define the object's graphical appearance, especially to convey that it is an entity that the user can drag away and drop on something (for instance, by looking like an icon). Finally, it manages the connection to the system's source of events, in this case mouse device events.

For our purposes here, if suffices to characterize a mouse event (of the various kinds mentioned in the figures: TMouseDownEvent, TMouseUpEvent, etc.) as an object that encodes an event type (a "mouse down" event vs a "mouse up") and a location of the cursor when the event occurred. This most commercially available system that have facilities for events of this type have this character, and therefore the details should be familiar to those skilled in the art of engineering such systems.

In a mouse event handling view, a subclass of TView and MMouseEventHandler, the MMouseEventHandler member function StartMouseEntryEvents( ) is available for turning on the reception of events which report that the mouse has entered and exited the region of the desktop that the view extends over. These events are received view the member functions MouseEntered( ) and MouseExited( ). StopMouseEntryEvents( ) stops the reception of these events.

The detailed processing for a typical drag-and-drop interaction is presented below. A drag-and-drop interaction involves two event-handling graphical objects on the desktop. One of them, the drag source, is an mouse event handling view. The other, the drop acceptor, is a drop accepting view. The drop acceptor could be any one of the drop acceptors in a system state, for example the printer icon, like that depicted in FIG. 4.

The complete interaction involves the following steps:

1) The user moves the cursor to what is represented as a draggable entity inside the drag source object. For instance, this might be a draggable icon object inside of a containing window.

2) The user depresses the mouse button (and doesn't let up).

3) The system determines, by comparing the location of the event with the visible mouse event handling views present on the desktop, which mouse event handling view the event geometrically contained in, in other words which view object was "hit".

4) The system posts a TMouseDownEvent in the event queue associated with the hit view.

5) The thread of execution handling the events in that queue handles the event by calling the member function MouseDown( ) on the hit mouse event handling view object.

6) As the hit view is publishing a draggable entity (as are assuming in this example interaction), it determines that the cursor position of the mouse down event is geometrically contained on a draggable entity that it is graphically presenting.

7) The drag source creates (or in general, provides) one or more TDraggedRepresentation subclass objects to represent an item that is logically being dragged by the user. The specific example dealing with the proxy below addresses how this is done for a particular application of drag-and-drop.

8) The drag source instantiates an object support by the system implementing the preferred embodiment called TDragAndDropInteractor. The creation and maintenance of TDragAndDropInteractor is how it is expressed to the system that a drag-and-drop interaction has started and is going on. TDragAndDropInteractor accepts in its constructor a list of one or more TDraggedRepresentation subclasses provided (created in the previous step). In the particular design described here, we have the TDragAndDropInteractor's constructor also taking a graphic object (a subclass of MGraphic, an assumed abstract system interface for a passive graphic object). This is used by the implementation of TDragAndDropInteractor for displaying on the desktop graphical feedback to the user of an item being dragged as the user moves the cursor in the steps that follow below.

9) The drag source calls StartMouseMovedEvents( ) on itself.

10) The user makes motions with the cursor in order to move the cursor, which is dragging an item, to another point on the desktop where the item is to be dropped. In response to the user's cursor motions MouseMoved ( ) will be called on the drag source. The drag source implements this method by calling DragAt( ) on the TDragAndDropInteractor it has created in Step (8) and it passes as the parameter the location of the TMouseMovedEvent. The drag source's MouseMoved( ) member function, and therefore the drag-and-drop interactor's DragAt( ) member function, is called once for every mouse moved event generated by the system in response to the user's motion of the cursor.

11) TDragAndDropInteractor's DragAt( ) member function is implemented (by the system) as follows. Given the state of the system such as that depicted in FIG. 4, where there are drop accepting views present on the desktop, it looks to see if the coordinate point passed to it in DragAt( ) is over any of the drop accepting views. If the point is found to be over a drop accepting view that it was not over in the previous call to DragAt( ), it posts a TDragEnterEvent to the event queue associated with the drop accepting view that new point is over. If the point in the previous call to DragAt( ) was over a different drop accepting view, or it was over a view last time but the point is not over any view in the current call, it posts a TDragExitEvent to that view. A drop accepting view receives the drag enter and exit events, when the events are handled, in the MDropAcceptor member functions DragEnter( ) and DragExit( ). These functions can be overridden by the drop acceptor implementation to provide graphical feedback to the user to indicate that the view is receptive to having an item that is being dragged over it dropped on it. For instance, the feedback may be a change in the color of the receptive view. One of ordinary skill in the art will readily grasp that it could provide the list of dragged representations with or associated with the drag enter event so that the implementation of the feedback can express the actual acceptability of the dragged item.

12) The user drags the item to the desired destination drop acceptor and positions the cursor over it.

13) The user lets up on the mouse button.

14) The system posts a TMouseUpEvent to the event queue associated with the drag source.

15) The thread handling the events in the event queue associated with the drag source handles this event by calling the member function MouseUp( ) of the drag source, which calls the member function DropAt( ) on the TDragAndDropInteractor in a fashion similar to MouseMoved( ) translating to a call to DragAt( ) on the drag-and-drop interactor.

TDragAndDropInteractor's DropAt( ) member function is implemented as follows. First, they handle posting drag exit events to any drop accepting views "exited" since the last call to DragAt( ) (if any) in a manner identical to the implementation of DragAt( ). Then, it looks to see if the parameter point, the cursor point at which the drop occurred, is over a drop accepting view. If it is, it posts a TDropEvent to that view. As part of the drop event or associated with it, it makes the list of dragged representations available to the handler of the drop event.

16) The thread handling the events in the event queue associated with the drop acceptor handles this event by calling the member function Drop( ) on the drop handler. MDropAcceptor's Drop( ) member function has a standard implementation as follows. It takes the list of dragged representation associated with the drop event and calls ChoosePreferredTypes on itself passing it the list of dragged presentations. If the implementation of virtual function ChoosePreferredTypes0 properly chooses a type description of an item to accept, this type description and the dragged representation from the list which matches this time is passed back to the drag acceptor in a call to AcceptDrop( ) which is also passed the cursor position of the final drop event. With this, a dragged representation has been transferred from a drag source object to the drop acceptor, and the interaction is complete.

This interaction allows a user to specify the carrying of a piece of information, implemented as a dragged representation object, from one graphical object at one point on the desktop to another graphical object on another point. What is done in response to the transport of this dragged representation object is specific to how this mechanisms are deployed. Some examples involving the proxy are described later. Here is an illustration of why it is interesting for a drag source to provide to the drag-and-drop interactor not just one dragged representation but a list of representations. This illustration involves the ability of data objects to be converted from one data type to another or viewed through an alternative access model. An example of such a case is a modern word processor document. In addition to it being accessible as A) a document of the word processor application which created it (and thereafter allows it to be read and edited on the computer), the document's data can also be usefully viewed as B) a stream of text characters (e.g., for a spelling checking operation), C) a page of graphics (e.g., for a printer to print it), or D) imported input to different word processor application product (so that can be accessed by users that do not have access to the original creating application).

Consider the case of a such a convertible or flexibly accessible data object being the item that is dragged in a drag-and-drop interaction. The useful conversion of the data object or the specific access model on the data depends on the function of the drop acceptor that receives the data object. For instance, in a word processor document, the drop acceptor may be A) the application of the document itself, B) a spelling checker utility, C) a printer, or D) an alternative word processor application. At the start of the drag-and-drop interaction, when the dragged object is starting to be dragged, the system cannot determine the ultimate destination drop acceptor because that is about to be specified by the subsequent mouse motion by the user. This means that the dragged representation, which is created at the start of the drag-and-drop interaction, must carry facilities for serving any of the useful conversions of alternative access that the ultimate drop acceptor may request. A practical solution to implementing such a conversion-capable dragged representation object is as follows. The dragged representation object does not carry the actual data object but instead carries 1) a list of types that the dragged object is available as (either through conversion or by access to an alternative interface, and 2) a surrogate of or a reference to the original object which sufficiently identifies or provides access to the original object so that access to it (through conversion or through a chosen access model) is possible. An example of such a reference is the location on the file system where the original data object stored.

Here are the main points of this illustration. 1) Participants of drag-and-drop which provide dragged representations (to be carried to drop acceptors) have the need and opportunity to provide utility through data convertibility or multiple access interfaces, and this capability is expressed by the functionality of dragged representation objects that they provide. This is the motivation for the dragged representation source object, discussed in the context of the proxy below, which encapsulates a facility for providing the appropriately capable dragged representation. 2) The flexibility of the representation of the dragged item is used to advantage by the programmed behavior of the drop acceptor that receives the dragged representation. For example, it is what provides the linkage to a word processor document representation and facilitates access of the document as: A) the unconverted document, B) a stream of text, C) pages of graphics layout, or D) an alternative document format.

Finally, several basic mechanisms of drag and drop must be illuminated to provide a thorough understanding of a preferred embodiment of the invention. First, practical constraint in implementing a user interaction such as this is that a "mouse down" event from the user may be used to specify one of several interactions, such as not just the beginning of "dragging" but perhaps of selecting an item if the use immediately lets up on the button without any cursor motion. Implementations may embellish the mechanism described above by deferring the creation of the drag-and-drop interactor until the user has pressed the button and moved the cursor by some small amount.

Second, in the detailed description of the drag-and-drop mechanism, the user specified a drag-and-drop interaction gesture by the actions of a single mouse and a single button on the mouse. Given the basic mechanism described above, extensions which involve different input devices, multiple input devices, or multiple buttons on the pointing device are possible given that the gesture for specifying the "carrying" of an item from one point on the display to another is well defined.

Third, in order to make the mechanisms that require posting drag-and-drop-related events more efficiently, the basic design providing a drop acceptor to express its acceptance criteria "up front" prior to any specific drag-and-drop interaction is necessary. This allows, for instance, the system implementation of the drag-and-drop interactor to use this information to cull away drag- and drop- related events to drop acceptors which are known to be uninterested in the dragged representation it is carrying.

Fourth, the description above deals, for clarity and simplicity, with an example were a single unit item (e.g. an icon) is being dragged (even though, as we have discussed, it is useful for the single item to have multiple representations). In most realistic applications it is useful, or necessary, to allow the user to select a collection of items and drag them all at once as an aggregate selection in one interaction.

Finally, the description of the drag-and-drop interaction above deals with a object being dragged from one source context to a different destination context. This differentiation of source and destination was applied for clarity of the description, and we mention here that the drag-and-drop mechanism encompasses cases where the source and destination is the same view object programmed to serve both roles.

Example Proxy Operations And Their
Implementation

Opening a document into a window with a proxy

Figure 8:
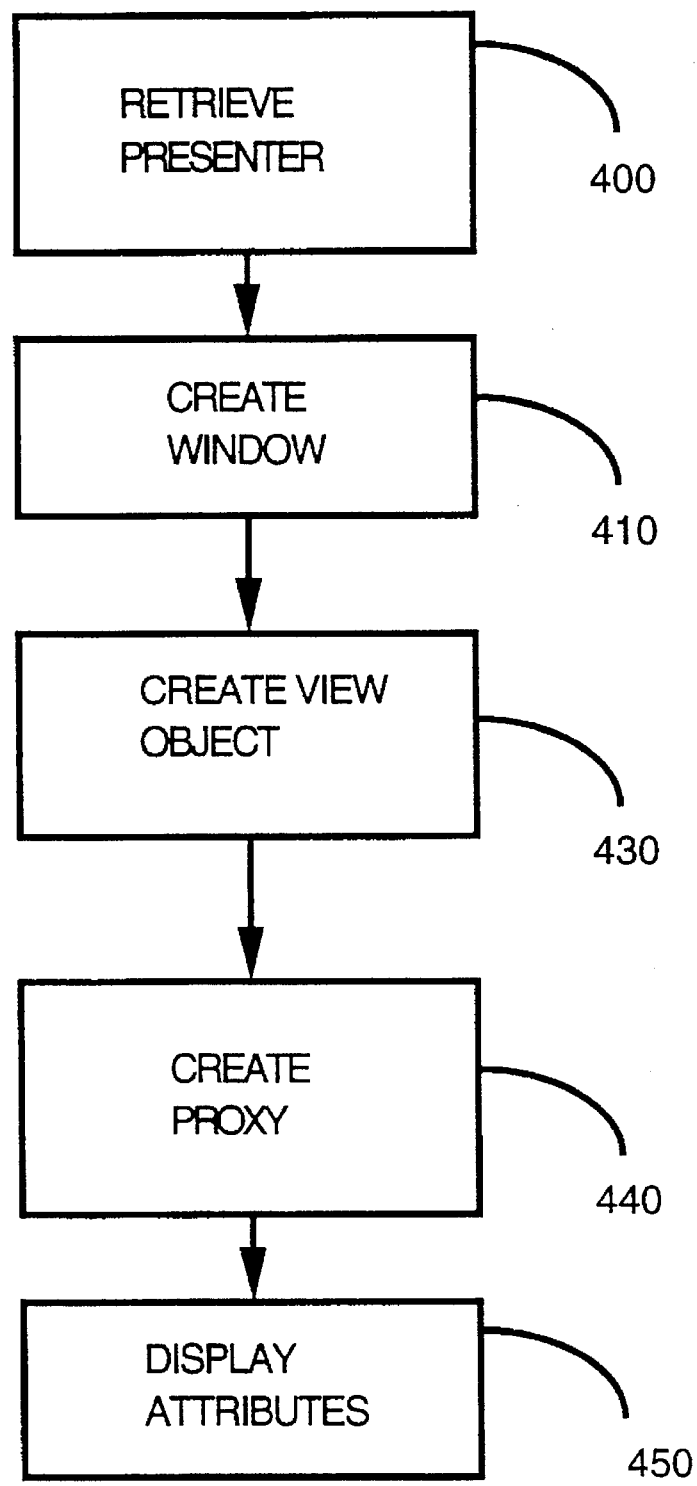
FIG. 8 is a detailed flowchart of the processing necessary for opening a document into a window.

A stored document, such as the document shown in FIG. 3, is opened to a graphical presentation. FIG. 2 depicts a document display in accordance with a preferred embodiment. FIG. 8 is a detailed flowchart of the processing necessary for opening a document into a window. Processing commences at function block 400 where the document presenter is retrieved from the stored document. Then, a call is made on the document presenter object to create a window presenting the document's contents at function block 410. A reference to the stored document is furnished for this call. The document presenter creates a window which is furnished with the following elements:

a) a facility 430 (e.g. "view" object) for displaying and editing the stored document's content data; the details of this facility are unimportant here and are not described;
  b) a proxy element 440, for instance with an appearance derived by retrieving a proxy icon graphic from the stored document. This proxy element, in conjunction with the window containing it, is an object that implements the direct user manipulations described below. In order to implement these operations, the window or the proxy element is furnished with a reference to the stored document; and
  c) optional other identifying attributes 450 contained in the stored document, like placing the name label from the stored document as the title of the window.

Dragging the proxy to another drop-accepting entity

Figure 9:
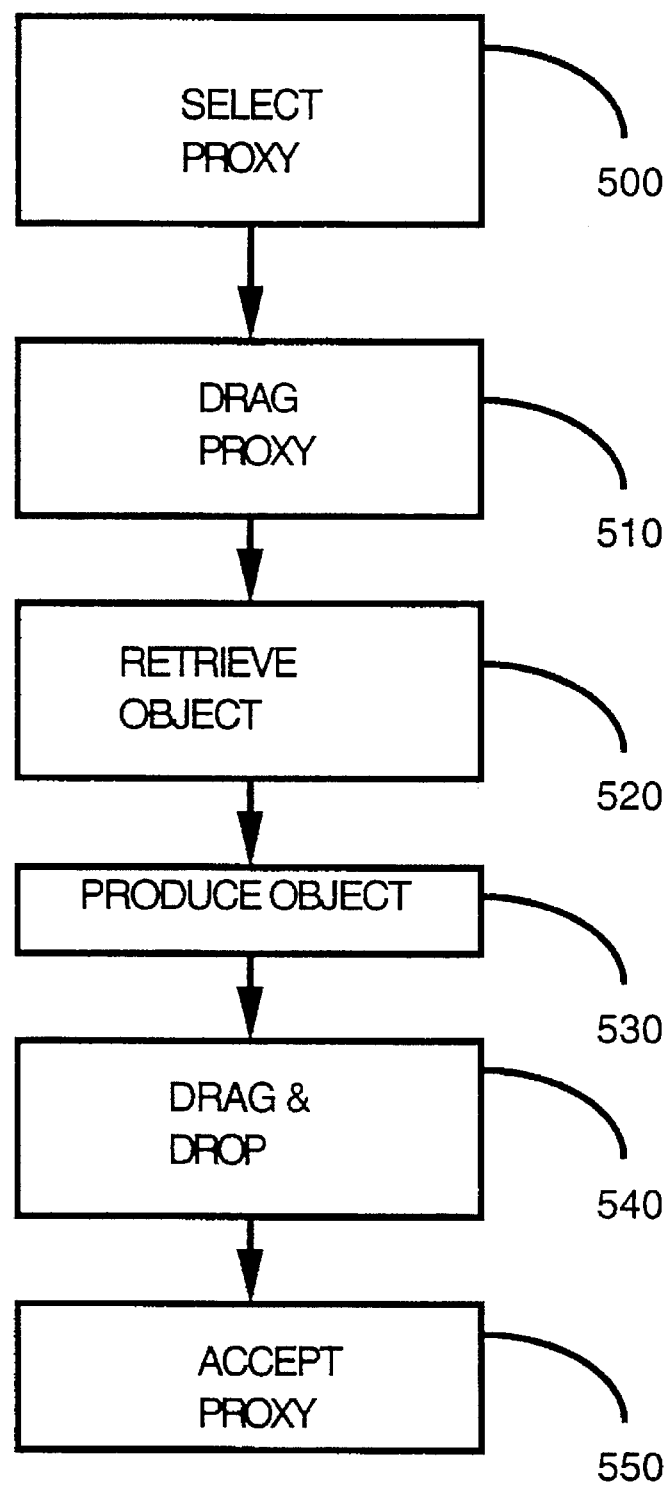
FIG. 9 is a detailed flowchart of the logic associated with dragging the proxy to another drop accepting entity in accordance with a preferred embodiment.

FIG. 9 is a detailed flowchart of the logic associated with dragging the proxy to another drop accepting entity in accordance with a preferred embodiment. To facilitate connecting with a drag-and-drop description of a preferred embodiment, the window containing and presenting the proxy is an event-handling graphical object that is the drag source. The user selects the proxy with the mouse as shown in function block 500 and drags the proxy icon to another location as described in function block 510. The window in conjunction with the proxy element is implemented to handle this user interaction as follows.

a) It uses the reference to the stored document to retrieve the dragged representation source object as shown in function block 520.
  b) The dragged representation source object produces one or more objects on the desktop representative of publication characteristics of a document. The document object(s) publish themselves to targets that receive the dragged proxy as shown in function block 530.
  c) The set of representation objects produced by the dragged representation source is furnished to the assumed "dragging" facility provided by (or implemented on) a system that supports this kind of user manipulation. The representation object(s) are "carried" by the system's dragging facility as shown in function block 540.
  3) The user drags the proxy to an accepting entity somewhere else on the screen and drops it as shown in function block 540.
  4) The dragging facility furnishes the carried representation objects to the accepting entity (assuming the user graphically dropped the proxy on an accepting entity) as shown in function block 550. What the accepting entity does with the carried representation is not important to this general mechanism.

An example of a set of representation objects provided by a document's dragged representation source is a word processor document. A word processor document's representation source would provide the following representations. The detailed logic of the nature and selection of representations provided by specific document types and what drop-accepting targets do with the selection of carried representation is unimportant to the current discussion and is not described here.

Dragging an item from an external source to the proxy

In this case, the proxy, or the window containing and presenting the proxy, on behalf of the proxy, assumes the role of a drop acceptor. A dragged representation that is dragged to an external source comes from another entity which is the drag source.

1) The user drags an item or items (e.g. icons) from some other entity displayed on the screen, brings it on top of the proxy element of the window under concern and drops it.
  2) A "drop" handling facility is assumed to be provided by (or implemented on) a system that supports this kind of user manipulation. Such a facility reports the occurrence of a drop and furnishes the representations carried as the dragged entity to an implementation deployed to handle such a drop. The window in conjunction with the proxy element deploys such an implementation, which handles the drop occurrence and the dropped representations as follows:
    a) It retrieves the drop acceptance handler object from the stored document.
    b) It invokes a drop handling call on this object, furnishing it with the dropped representations.

Note that the external source of the dragged item can be any proper participant of the system's dragging facility, including another proxy.

Human Interface Applications Of The Proxy Mechanism

Since a proxy, in accordance with a preferred embodiment, brings "workspace" functionality to a document currently active in a window environment, examples are presented with a description of behavioral characteristics when a proxy is a normal icon in a workspace context. This description is followed by a description of how a proxy behaves in an open window environment.

Document object.

In a workspace, a document icon can dragged from one container to another to move or copy it, or it can be dragged to the trash can or other icons representative of functional devices (e.g. a printer) and appliances or special icons that know how to read and interpret the data carried by the document. For example, if a document contains a mailing address, the document object is mailed to the address. Specifically, if it is a business card object, a letter or other document object can be dragged to and dropped upon the business card object to invoke a mailing operation to the address contained within the business card. If the address is an internet address or other network address, the document is transmitted via the network medium to the specified address. If no electronic address, exists in the business card object, then the user is prompted to enter the address. To initiate operations, an icon is selected, and the following operations are performed: Open, Make Reference, Duplicate, Show Properties. Each operation is detailed below. If the document icon is opened to a window with a proxy, then:

1) the proxy facilitates a move/copy/trash operations on an open and active document; and 2) the proxy can also be dropped onto devices and appliances, without closing the document or removing the proxy from the document.

Stationery Pad Object.

If a stationary pad object is opened into the workspace, then the icon creates a copy of the stationery pad base document and opens the document. If the stationery pad object is opened into a window with a proxy, then the stationery pad object cannot be in an opened state in a normal document sense, because opening it causes a copy (a normal document and not a stationery pad) to be created and opened within the document containing the proxy. Another variation is when a Show Properties window for a stationery pad has a proxy, it can be opened (to copy off and open a stationery document instance) from the Show Properties window.

Printer object.

A printer object is opened in the workspace, then it becomes an icon to which you can drag documents to have an associated hardware printer device print a document. If the printer object is opened to a window with a proxy, the printer object may opens into a window that shows the state of queued jobs, the state of the printer (like paper being out), or a control panel for special printer functions. Including a proxy in the window allows the user to continue to use the same interface for dragging a job to the printer, namely by dragging a document icon to the proxy icon.

Figure 10:
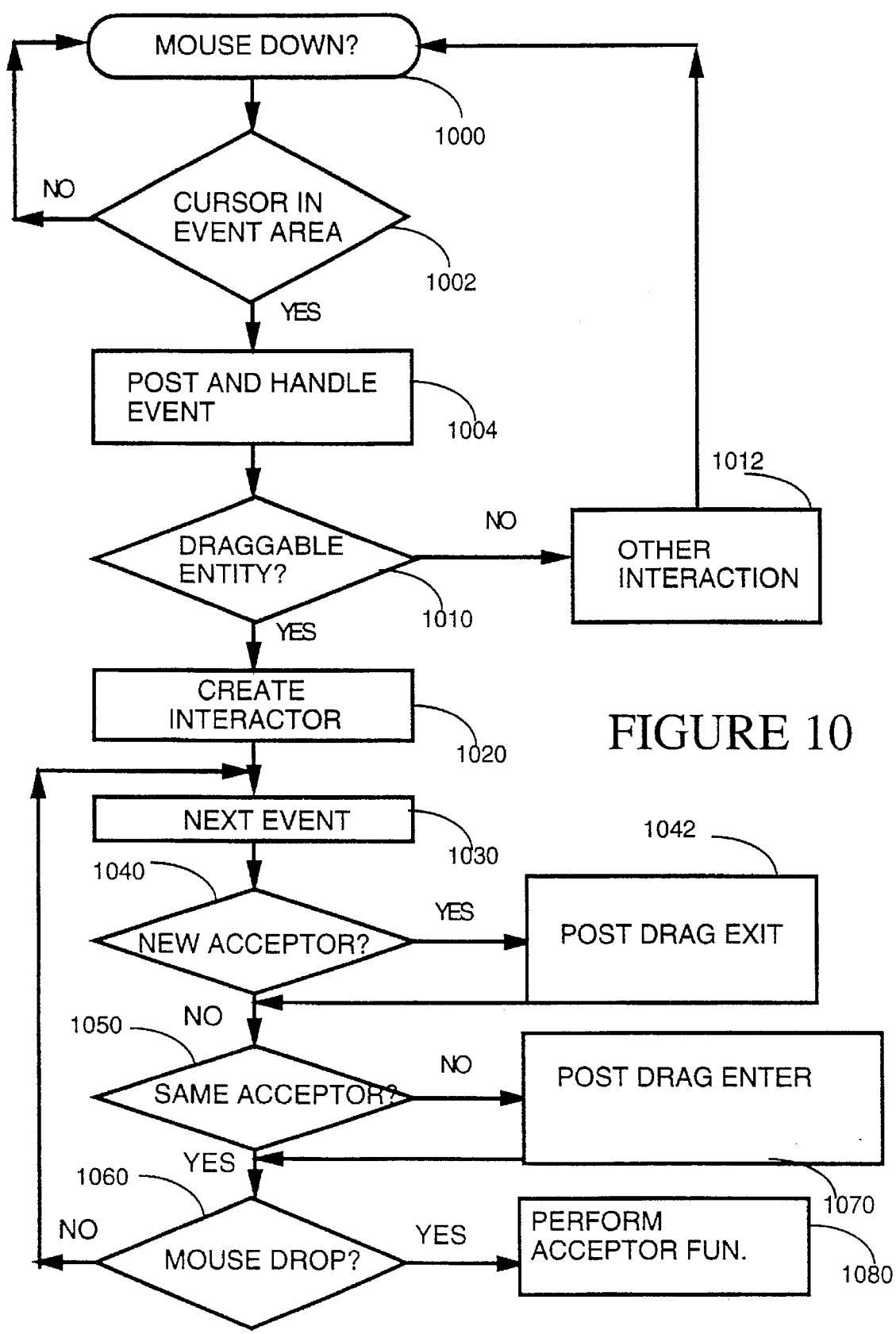
FIG. 10 is a flowchart of the proxy drag and drop operation in accordance with a preferred embodiment.

FIG. 10 is a flowchart setting forth the detailed logic associated with proxy operations in accordance with a preferred embodiment. Processing commences at function block 1000 when a mouse down occurs. Then a test is performed at decision block 1002 to determine if the cursor is located in an event area when the mouse down event was detected. If so, then the event is posted and handled as shown in function block 1004 and another test is performed at decision block 1010 to determine if a draggable entity has been selected. If not, then control is passed to another interaction as shown in function block 1012, and processing is returned to function block 1000 to await the next mouse down event. If a draggable entity is detected at decision block 1010, then a drag and drop interactor is created at function block 1020 and the next event associated with the next mouse action is received at function block 1030, and a test is performed at decision block 1040 to determine if a new acceptor has been positioned under the icon. If so, then post drag exit event as shown in function block 1042 and pass control to decision block 1050 to determine if the same acceptor is positioned under the selected icon. If it is not the same acceptor, then a drag enter event is posted at function block 1070 and control is passed to decision block 1060 to determine if a mouse drop event has occurred. If so, then perform the acceptor function as shown in function block occurred. If so, then perform the acceptor function as shown in function block 1080. If not, then pass control to 1030 to process the next event.

A background grammar analysis tool is implemented as a software icon to which you drag text documents to invoke an analysis tool to analyze a document that is dropped on the icon representative of the analysis tool. If the opened appliance window has a proxy, then the proxy provides the interface for accepting more documents to analyze while the current results are displayed in the same window. Another example could be a spell check operation invoked similarly.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A framework for creating, displaying and managing a proxy associated with a document on a computer system having a memory, a display, a pointing device, an event handler for detecting hit events, mouse down events, and mouse up events and for generating coordinate data associated with each event, and a view manager including a means for registering a target view, indicating the coordinates where on the display the target view is displayed, the framework comprising:

(a) class information stored in the memory defining a proxy object, which includes first program code means for associating the proxy object with a first document;

graphic data indicative of the proxy object;

(b) class information stored in the memory defining a draggable proxy object, which includes second program code means for associating the draggable proxy object with the proxy object;

a list of candidate types supported by the first document;

third program code means, responsive to a mouse up event and cooperating with the view manager, for determining whether the coordinate data of the mouse up event is over a registered target view and for issuing a drop message having the list of candidate types; and graphic data indicative of the draggable proxy object;

(c) class information stored in the memory defining a second document as a document container object from which a second document is created, the second document including a data structure for containing content data of the second document, fourth program code means for displaying a view of the content data on the display, fifth program code means for displaying a view of the proxy object, using the graphic data of the proxy object, sixth program code means, responsive to a hit event on the proxy view and a mouse down event, for creating a draggable proxy object from the class information defining a draggable proxy object and for displaying a view of the draggable proxy, using the graphic data of the draggable proxy object; and (d) class information stored in the memory defining a target object, which includes seventh program code means for displaying a view of the target object and for registering the target view with the view manager; eighth program code means, responsive to the drop message from the third program code means, for choosing a preferred type from the list; ninth program code means, responsive to the drop message from the third program code means, for performing a predetermined operation on the document associated with the proxy object utilizing the chosen type.

2. The framework of claim 1 wherein the list of candidate types indicates how the first document is accessible through a conversion process.

3. The framework of claim 1 wherein the list of candidate types indicates how the first document is accessible through an alternative interface.

4. An apparatus for document processing in a computer system having a processor, storage means attached to the processor, a display and a pointing device for manipulating views displayed on the display means, the apparatus comprising:

(a) a plurality of document objects resident in the storage means, each of the plurality of document objects containing content data and means for displaying on the display a view of content data;

(b) means controlled by the pointing means for causing means for displaying of one of the plurality of document objects to display a first view of the content data of the one document;

(c) means for creating a proxy object in the storage means, the proxy object having means for displaying a proxy view and means for associating the proxy object with any one of the plurality of document objects and having data representing a list of methods for accessing the content data of the document associated with the proxy object;

(d) means for causing the means for displaying a proxy view to display the proxy view embedded within the first view;

(e) a drop acceptor object having a member function responsive to manipulation of the proxy view by the pointing device, for selecting a preferred access method from the proxy object list; and (f) processing means for accessing the document associated with the proxy object using the preferred access method, and processing content data contained therein.

5. The apparatus of claim 4 wherein the proxy object list indicates how the first document is accessible through a conversion process.

6. The apparatus of claim 4 wherein the proxy object list indicates how the first document is accessible through an alternative interface.

7. Apparatus for document processing in a computer system having a processor, a storage attached to the processor, a display and an input device, the apparatus comprising:

(a) a first document object and a second document object resident in the storage, each of the first and second document objects containing content data, a list of data types characterizing the content data, display program code for displaying on the display a view of the content data and acceptance program code for determining an acceptable data type which can be displayed;

(b) means controlled by the input device for opening the first document object by executing the display program code in the first document object to display a content data view;

(c) means for creating in the storage a proxy object having program code for displaying a proxy image on the display, a reference to the second document object content data and a list of data types characterizing the second document content data;

(d) means controlled by the input device for executing acceptance program code in the first document object to determine whether a data type in the proxy object list of data types is acceptable; and (e) means responsive to a determination that a data type in the proxy object list of data types is acceptable for executing the proxy image display code to display a proxy image embedded within the first document object content data view.

8. The apparatus of claim 7 wherein the first document object includes means for constructing a drop acceptor object containing the acceptance program code.

9. The apparatus of claim 8 wherein the drop acceptor object includes means for defining a target area on the display and means for determining whether the proxy image is within the target area.

10. The apparatus of claim 9 wherein the acceptance code executing means executes the acceptance program code when the proxy image is within the target area.

11. The apparatus of claim 7 further comprising means for processing the first document object content data.

12. The apparatus of claim 11 wherein the processing means is responsive to a determination that a data type in the proxy object list of data types is acceptable for processing the second document object content data.

13. A method for document processing in a computer system having a processor, a storage attached to the processor, a display and an input device, the method comprising the steps of:

(a) creating a first document object and a second document object in the storage, each of the first and second document objects containing content data, a list of data types characterizing the content data, display program code for displaying on the display a view of the content data and acceptance program code for determining an acceptable data type which can be displayed;

(b) opening the first document object by executing the display program code in the first document object to display a content data view under control of the input device;

(c) creating in the storage a proxy object having program code for displaying a proxy image on the display, a reference to the second document object content data and a list of data types characterizing the second document content data;

(d) executing, under control of the input device, acceptance program code in the first document object to determine whether a data type in the proxy object list of data types is acceptable; and (e) executing the proxy image display code to display a proxy image embedded within the first document object content data view when a data type in the proxy object list of data types is acceptable.

14. The method of claim 13 wherein step (a) comprises the step of:

(a1) creating a first document object including means for constructing a drop acceptor object containing the acceptance program code.

15. The method of claim 14 wherein step (a1) comprises the step of:

(a1a) constructing a drop acceptor object which includes means for defining a target area on the display and means for determining whether the proxy image is within the target area.

16. The method of claim 15 wherein step (d) comprises the step of:

(d1) executing the acceptance program code when the proxy image is within the target area.

17. The method of claim 13 further comprising the step of:

(f) processing the first document object content data.

18. The method of claim 17 wherein step (f) comprises the step of:

(f1) processing the second document object content data when a data type in the proxy object list of data types is acceptable.

19. A computer program product for document processing in a computer system having a processor, a storage attached to the processor, a display and an input device generating input device signals, the product comprising a computer usable medium having computer readable program code thereon including:

(a) means for constructing a first document object and a second document object in the storage, each of the first and second document objects containing content data, a list of data types characterizing the content data, display program code for displaying on the display a view of the content data and acceptance program code for determining an acceptable data type which can be displayed;

(b) means responsive to the input device signals for opening the first document object by executing the display program code in the first document object to display a content data view;

(c) means for constructing in the storage a proxy object having program code for displaying a proxy image on the display, a reference to the second document object content data and a list of data types characterizing the second document content data;

(d) means responsive to the input device signals for executing acceptance program code in the first document object to determine whether a data type in the proxy object list of data types is acceptable; and (e) means responsive to a determination that a data type in the proxy object list of data types is acceptable for executing the proxy image display code to display a proxy image embedded within the first document object content data view.

* * * * *